United States Patent [19]

Brotcke

[11] Patent Number: 4,753,418
[45] Date of Patent: Jun. 28, 1988

[54] NON-RISE FAUCET ASSEMBLY HAVING STEM LOCATOR CAP TO INSURE PROPER SEALING

[75] Inventor: John J. Brotcke, Sussex, Wis.

[73] Assignee: Consolidated Ceramic Limited, British Virgin Isls.

[21] Appl. No.: 72,697

[22] Filed: Jul. 13, 1987

[51] Int. Cl.⁴ .............................................. F16K 5/08
[52] U.S. Cl. ..................... 251/288; 251/312
[58] Field of Search ............... 251/286, 287, 288, 309, 251/312; 137/454.6, 614.11

[56] References Cited

U.S. PATENT DOCUMENTS

| | | | |
|---|---|---|---|
| 4,319,735 | 3/1982 | Moen | 251/288 X |
| 4,331,176 | 5/1982 | Parkison | 137/454.6 X |
| 4,589,629 | 5/1986 | Gaffney et al. | 251/288 |

FOREIGN PATENT DOCUMENTS 1275646  10/1961  France ................. 251/287

*Primary Examiner*—A. Michael Chambers
*Assistant Examiner*—John C. Fox
*Attorney, Agent, or Firm*—James E. Nilles; Donald C. McGaughey

[57] ABSTRACT

A non-rise faucet assembly including a body 12 having a bore 14 therethrough. The bore includes a fluid inlet end 16, a valve stem chamber 17, a valve seat 19 and a fluid outlet 22. A valve stem 29 is rotatably mounted in the bore with a valve means 33 in engagement with the valve seat. The degree of rotation of the valve stem is controlled by a valve stem rotation restricting means 43 to define the fluid flow open and closed positions of the valve. A locator cap 51 is provided having a first abutment means 52 in axial thrust transmitting engagement with the valve stem and a second abutment means 53 in engagement with said body for limiting the amount of axial thrust transmitted to the valve stem by the first abutment means 52 to a predetermined optimum amount. A retaining means 76 is releasably secured to the body 12 to apply axial thrust to the first abutment means. The locator cap has a third abutment means to secure the cap against rotation relative to the valve stem and a fourth abutment 69 that is selectively engageable with the valve stem rotation restricting means.

4 Claims, 2 Drawing Sheets

NON-RISE FAUCET ASSEMBLY HAVING STEM LOCATOR CAP TO INSURE PROPER SEALING

BACKGROUND OF THE INVENTION

The present invention relates to a non-rise faucet assembly and, more particularly to a non-rise faucet having a locator means to resist radial forces, to insure that a predetermined optimum axial sealing force is applied to the associated valve and seat elements of the assembly and to define fluid flow open and closed positions for a faucet valve stem.

In such faucet assemblies, a valve stem is inserted through a bore in a valve body into a chamber. In accord with known practice the valve stem has a disc valve located at a lower end thereof for cooperative engagement with the disc valve seat for regulating the flow of fluid through the body and into a conventional faucet spout upon rotation of the valve stem between fluid flow open and fluid flow closed positions. Such valve stems usually include an upper O-ring placed around the stem for sealing purposes and forces radial to the axis of the valve stem are applied to the O-ring when a handle at the top of the stem is turned. Such radial forces cause O-ring wear, valve stem wear on adjacent surfaces and handle wobble.

In faucets of this type it is essential for long trouble free life that radial forces imposed on the valve stem O-rings and adjacent valve stem surfaces, when the faucet handle is turned, be minimized especially when the faucet stem is constructed of plastic which is more flexible than metal; that a predetermined amount of axial sealing force be applied to urge the valve disc and seat together; and that suitable means be provided for defining the fluid flow open and closed positions of the valve stem at all times even when the faucet handle is removed for service.

One example of the prior art is shown in U.S. Pat. No. 3,788,601, of Jan. 29, 1974, wherein the valve stem is supported against radial forces close to the upper O-ring and wherein a rotational stop means to define fluid flow open and closed positions, is located between the handle and an upward extension of a sleeve. With this design O-ring and valve wear is not minimized. Removal of the handle for services removes the rotational stop means and it is no longer easy to determine where the flow open and closed positions are.

In order to minimize the problem of applying the optimum amount of axial force it is known from aforementioned U.S. Pat. No. 3,788,601 and from U.S. Pat. No. 4,589,629, issued May 20, 1986 to Thomas E. Gaffney et al, to install coil spring biased valve inserts in the valve disc which, move into regulating or sealing registery with fluid flow openings in the valve seat as the valve stem is rotated. When the valve stem is assembled into the body the coil springs are automatically compressed. The valve stem is secured in place by a pin which loosely passes through radially aligned openings in the body and V-shaped openings in the valve. This prior art design does not absorb or minimize the radial force being applied to the valve stem upper O-ring and does not control the amount of axial force as precisely as is desired. The loose fit between the pin, the body and stem results in varying amounts of axial force being applied to the coil springs. The compression rates of the coil springs in faucets of this type are significantly more non-linear than normally expected due to their short axial length necessitated by the small size of the component parts consequently undesirably high variations in valve to valve seat pressure can result. Further, during operation, wear of the pin and the material around its associated opening in the stem, which is usually made of plastic to reduce costs, further increases the tolerances and results in a lessening of the valve to valve seat axial force.

With the above factors in mind it will be appreciated that there exists a need for a simplified faucet design wherein the assembly: will resist and minimize the radial forces applied to the valve stem and its upper O-ring when the faucet handle is turned; will assure that only a predetermined amount of axial sealing force is applied to urge the valve disc and seat together; and will provide rotatable stop means for defining the fluid flow open and closed positions of the faucet at all times even when the handle is removed from service. Further, in order to reduce cost and assembly time, it is desired to accomplish the above needs with a mimimum number of component parts in the faucet assembly. To these ends it is desirable to use a single element of the assembly to automatically absorb and minimize radial forces, to control the optimum amount of axial sealing force and to define the degree of rotation of the stem between fluid flow open and closed positions.

SUMMARY OF THE INVENTION

The present invention provides a non-rise faucet assembly of the general type described above wherein a novel multifunction locator cap having a plurality of abutments is mounted to transmit axial thrust to the stem. The axial force is initially applied to the locator cap by a stem retaining means in the form of a releasable cap nut. The locator cap includes a first abutment in axial thrust transmitting engagement with the stem and second abutment in engagement with a limit stop on the body for limiting the amount of axial thrust transmitted to the stem by the first abutment means to a predetermined amount to insure that only a predetermined optimum axial sealing force is applied to urge the valve against the seat after the valve has been assembled.

The invention also includes a third abutment on the locator cap for operative contact with the body to secure the locator cap against rotation relative to the body; and a fourth abutment on the locator cap which is selectively engageable with a rotation restriction means on the stem for limiting the rotation of the stem to define fully open and closed positions of the faucet valve.

More particularly the first abutment means of the locator cap includes a hollow sleeve portion having an upper and lower terminus. The sleeve is adapted to be placed in spaced surrounding relation to the stem with the lower terminus being urged by the cap nut into axial contact with a limit stop presented by the body.

The second abutment means of the locator cap comprises a flange portion that projects radially inward, preferably from the upper terminus of the sleeve. The flange portion is positioned in axial thrust transmitting relation between the cap nut and the stem.

Further, the third abutment means includes an index tab that engages an indent means on the body to secure the locator cap against rotation relative to the body. Preferably the indent means comprises an axially extending slot in the body with the index tax extending axialliy from the lower terminus of the locator cap sleeve into the axial slot.

In addition the stem rotation restriction means includes a first shoulder means that projects radially outward from the stem and the fourth abutment means includes a second shoulder means projecting radially inward from the sleeve for contact with the first shoulder means when the locator cap is in an installed position and the stem is rotated to its fully opened and closed fluid flow positions of its associated valve. Preferably the index tab is an axial extension of the second shoulder means.

More particularly, the first shoulder means includes a pair of diametrically opposed first ribs extending axially along and projecting radially outward from the stem with each rib being separated from the other by a circumferentially extending recess. The second shoulder means includes a pair of diametrically spaced apart second ribs projecting radialy inward from the sleeve. Each of the second ribs project into one of the circumferentially extending recesses. Preferably each of the first ribs terminate at their upper ends in an axial thrust transmitting bearing surface which is adapted for engagement with the first abutment means.

The locator cap additionally includes a radial force absorbing portion that is contactable by a radial force transmitting area on the valve stem when the valve stem is flexed beyond a predetermined amount.

DETAILED DESCRIPTION OF THE PREFERRED EMBODIMENTS

Figure 1:
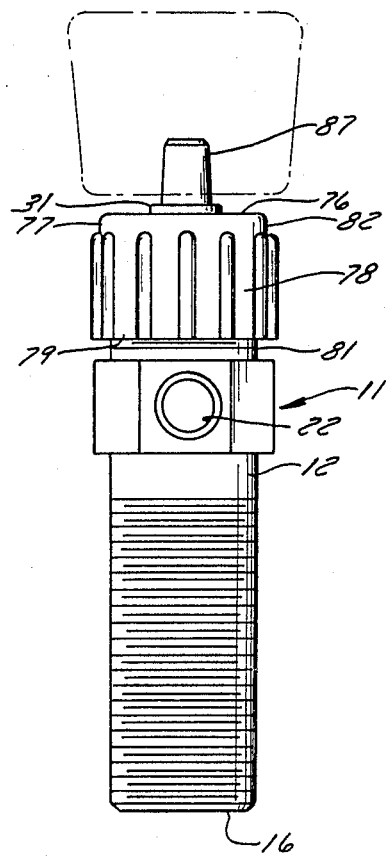
FIG. 1 is an elevational view of the non-rise faucet assembly in a fully assembled condition with the handle, which forms no part of the invention, shown in dot-dash lines.

Referring to the drawings the faucet assembly is identified by the reference number 11. The assembly includes a body 12 having a continuous bore 14 preferably extending axially therethrough. The bore 14 includes a fluid inlet end 16 adapted to be connected to a source of fluid not shown, a valve stem chamber 17 in fluid communication with the inlet 16, a valve seat 19 preferably presented by a disc valve seat insert 21 adapted to be inserted in the bore 14, a fluid outlet 22, and an upper end 23. The valve insert 21 comprises a housing having a pair of bores 26 communicating with the fluid inlet end 16, an O-ring groove 27 and a key 28 for assuring correct orientation of the insert 21 in the bore 14.

The faucet assembly further includes a valve stem 29 having an upper end 31 and a lower end 32. The valve stem 29 is adapted for insertion into the bore 14. The lower end 32 of the valve stem 29 includes a disc valve 33 non-rotatably affixed thereto. The stem 29 has an axis of rotation 34 and its associated disc valve 33 rotates about axis 34 as the stem is rotated. The lower end 32 of the valve stem 29 has a pair of bores 37 corresponding to the valve insert bores 26 and in alignment therewith when the stem 29 is in a fluid closed position. A seal 38 is inserted in each of the bores 37 and the seal is biased downwardly against the flat surface of disc valve 33 by springs 39 so that fluid cannot enter the valve stem chamber 17 when the seals 38 are in position over the valve insert bores 26. When the valve stem 29 is rotated to move the seals 38 off the bores 26 fluid can enter the valve stem chamber with the volume of fluid flow being controlled in response to the degree to which the valve insert bores 26 are opened. The lower end of the valve stem 29 also includes an O-ring 41 which prevents the fluid from exiting the chamber 17 axially along the valve stem 29.

Figure 3:
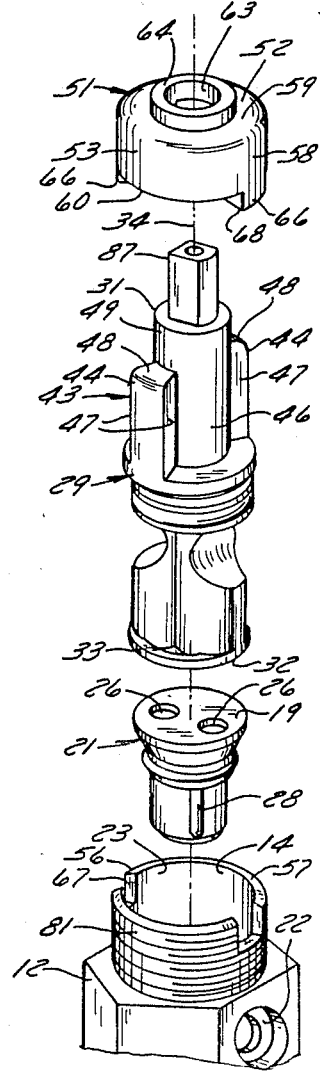
FIG. 3 is an exploded perspective view showing the components of the non-rise faucet assembly with the cap nut shown in FIGS. 1 and 2 being omitted.

The valve stem 29 incorporates a rotation restriction means 43 which includes first shoulder means in the form of a pair of diametrically opposed ribs 44 that project radially outward from the stem. Each rib 44 is separated from the other by a circumferentially extending recess 46 which may be arcuate in form as best shown in FIG. 3. Each rib 44 includes axially extending stop surfaces 47 and an axial thrust transmitting surface 48, best seen in FIG. 3, the function of which will be more fully explained hereinafter. The valve stem 29 also includes an enlarged radial force transmitting area 49 located just above the ribs 44 and just as close a possible to a handle mounting part 87 to cooperate with radial force absorbing portion 64 on a locator cap 51 as will now be described.

Figure 4:
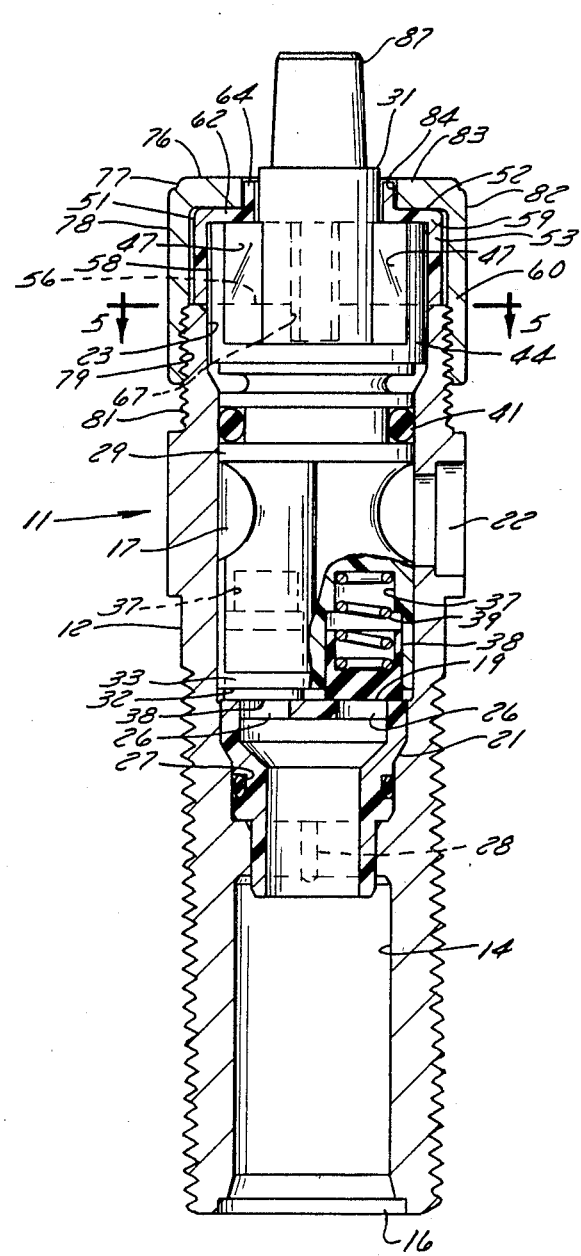
FIG. 4 is an enlarged sectional view of the non-rise faucet assembly shown in FIG. 1 with portions being in partial section.

A locator means in the form of a multi-function locator cap 51 is provided to limit the amount of axial force that can be applied to the valve stem 29. The locator cap 51 has a first abutment means 52 (FIGS. 3 and 4) that is in axial thrust transmitting engagement with the valve stem 29 and more specifically in engagement with the axial thrust transmitting surfaces 48 of the rib 44. The locator cap 51 has a second abutment means 53 which is in engagement with the valve stem body 12 and preferably with a limit stop 56 constituted by the champfered top edge 57 of the body 12. More specifically, and with reference to FIGS. 4 and 5, it will be noted that; the second abutment means 53 is preferably constituted by an annular hollow sleeve 58 having an upper terminus 59 and a lower terminus 60; and the first abutment means 52 is preferably constituted by an annular flange 62, having an aperture 63 sized to pass over the upper end 31 of stem 29, which projects radially inward from the upper terminus 59 of the sleeve 58. The axial length of the sleeve 58 is precisely predetermined as when it contacts top edge 57 of the body no additional axial movement of the sleeve can occur and consequently no more axial force will be applied to stem 29 as wil be more fully explained hereinafter.

It is advantageous for reducing component manufacturing costs and assembly time for the locator cap to perform more than one function. Thus the locator cap 51 includes a third abutment means 66 operatively engaging the body 12 for indexing the cap in a desired non-rotational position relative to the body 12. The body 12 has an indent means in the form of a pair of axially extending slots 67 in the top edge 57 of the body 12. The third abutment means may comprise a pair of index tabs 68 located dramatically opposite of each other and extending axially from the lower terminus 60 of the locator cap sleeve 58. The tabs 68 are dimensioned to fit snugly into slots 67 so that while the stem may rotate within the cap the cap 51 itself may not rotate relative to body 12. The cap also may include a fourth abutment means in the form of second shoulder means 69, best seen in FIG. 5, projecting radially inward from the sleeve 58. The second shoulder means 69 preferably comprise a pair of diametrically spaced apart second ribs 71, 72 projecting radially inward from the sleeve 58 with each rib 71, 72 projecting into one of the circumferentially extending recesses 46. Each of the ribs 71, 72 also has a pair of axially extending a stop surfaces 73 set at a radial angle, relative to the stem 29, such that when stem 29 is rotated in either direction one of the stop surfaces 73 thereon will come into face to face engagement with one of the corresponding stationary stop surfaces 47 to define the fluid flow open and closed positions of the valve stem.

Figure 2:
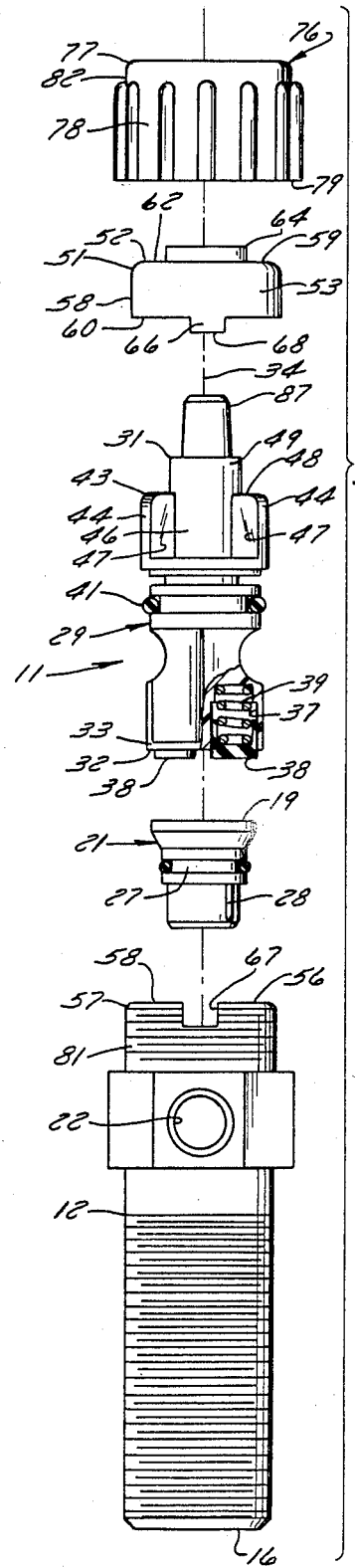
FIG. 2 is an exploded elevational view showing the components of the non-rise faucet assembly of FIG. 1 in more detail.
Figure 6:
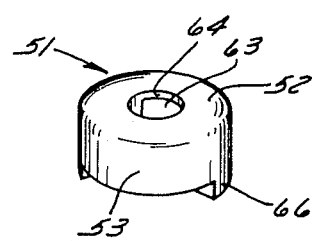
FIG. 6 is a detailed perspective view of a modified form of only the locator cap which appears as part of the faucet assembly shown in FIG. 3.

In addition the locator cap 51 includes a radial force absorbing portion 64 which is located as close as possible to the handle mounting part 87 and axially spaced as far as possible from O-ring 41. As shown in FIG. 2, portion 64 may comprise a collar projecting upwardly from the flange 62. It is obvious that the collar could be eliminated with the inside of flange aperture 63 being the radial force absorbing portion 64 as shown in FIG. 6. Any undue flexing of the valve stem 29 will result in its contacting portion 64 which will absorb the radial force to minimize wear on O-ring 41. The clearance between the portion 64 and the part 87 predetermines the amount of flexing of stem 29 that will be permitted.

A retaining means 76 is releasably secured to the body 12 for applying axial thrust to the locator cap 51. Preferably the retaining means 76 comprises a cap nut 77 having a tubular portion 78, one end 79 of which is internally threaded. The internally threaded end 79 mates with an externally threaded upper portion 81 of the body 12. The other end 82 of the tubular portion 78 is closed by a radially inward flared rim 83 apertured at 84 to receive the valve stem upper end 31 therethrough. The flared rim 83 has an inner surface that is adapted to engage the first abutment means 52 when the cap nut 77 is in an installed position.

Figure 5:
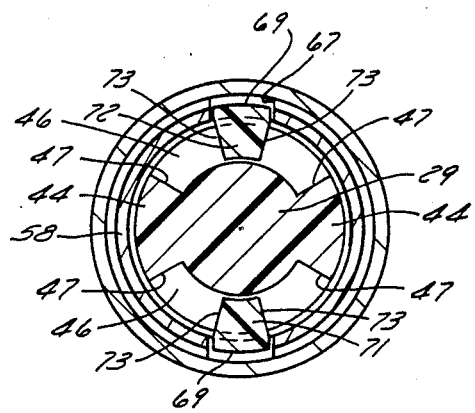
FIG. 5 is a cross-section view taken along line 5—5 of FIG. 4.

To assemble the valve components the valve seat insert 21 is first placed into the bore 14 with the key 28 orientating the insert bores 26 in their proper position. The valve stem 29 is then inserted into the valve stem chamber 17 with the valve seal inserts 38 in contact with the valve seat 19. The locator cap 51 is lowered and oriented so that index tabs 68 thereon enter slots 67 in the valve body. In order for this to occur, the valve stem 29 must be orientated so that the recesses 46 are in alignment to receive the internal second ribs 71, 72 of the locator cap, as shown in FIG. 5. This orientation of the valve stem automatically places the valve seals 38 in proper position relative to the valve insert bores 26. The cap nut 77 is then threaded onto the threaded portion of body 81. The inwardly flared rim 83 of cap nut 77 contacts the cap nut flange 62 and as the cap nut is threaded downwardly the rim 83 to the flange 62 contact will force the associated sleeve 58 downwardly until the lower terminus 60 of sleeve 58 contacts the limit stop 56 constituted by the top edge of the body 12. This movement of the stem 29 compresses the seal insert springs 39 the precise amount to insure that only a predetermined optimum axial sealing force is applied to urge the valve inserts 38 against their associated valve seat 19. A faucet handle shown in dot-dash lines in FIG. 1 is nonrotationally installed on the upper end 31 of stem 29 in conventional manner.

With reference to the foregoing the present invention provides an improved non-rise faucet assembly having a locator cap to insure that only a predetermined optimum axial sealing force is applied to associated valve and seat elements. This locator cap also absorbs radial forces which cause stem flexing beyond a predetermined amount and provides abutments for defining fluid flow open and closed position of the valve stem. These and other advantages are achieved by the present invention and the embodiment shown is by way of example and not as a limitation as the disclosure will suggest modifications and changes to those skilled in the art that fall within the scope of the invention.

What is claimed as the invention is:
1. In a non-rise faucet assembly:
a body (12) having a continuous bore 14) extending axially therethrough which includes a fluid inlet end (16), a valve stem chamber (17) in fluid communication with said inlet end, a valve seat (19, 21), a fluid outlet (22) and a limit stop (56);
a valve stem (29) having an axis of rotation, an upper end (31) and a lower end (32) adapted for insertion into said bore;
a valve (33) secured to said valve stem lower end and movable relative to said valve seat upon non-rising rotation of said stem, into selective cooperation with said valve seat for regulating the flow of fluid from said fluid inlet end through said valve stem chamber and out of said fluid outlet;
rotation restriction means (43) operatively associated with said stem for limiting the rotation thereof;
the improvement comprising:
a locator cap (51) mounted on said stem and having,
a first abutment means (52) having a flange portion (62) in axial thrust transmitting engagement with said stem when said faucet is in assembled condition;
a second abutment means (53) having a hollow sleeve portion (58) which includes an upper terminus (59) and a lower terminus (60), said sleeve positionable in spaced surrounding relation to said stem with said lower terminus being in axial contact with said limit stop (56) on said body, said axial contact between said lower terminus and said limit stop limiting the amount of axial thrust that can be applied by said locator cap to said stem to a predetermined amount to insure that only a predetermined optimum axial sealing force is applied to urge said valve against said seat;
a third abutment means (66) operatively engaging said body for indexing said cap in a desired non-rotational position relative to said body, said third abutment means including an axially extending slot (67) in said body, and an index tab (68) extending axially from said lower terminus (60) of said locator cap sleeve into said slot;
a fourth abutment means (69) selectively engageable with said rotation restriction means for limiting rotation of said stem in said valve chamber; and
a radial force absorbing portion (64) contactable by said valve stem in the event of axial flexing of said valve stem beyond a predetermined amount; and a retaining means (76) releasably secured to said body for applying axial thrust to said locator cap.

2. A non-rise faucet assembly according to claim 1 wherein said stem rotation restriction means (43) includes a first shoulder means (44) projecting radially outward from said stem and wherein said fourth abutment means (69) includes a second shoulder means projecting radially inward from said sleeve (58) for contact with said first shoulder means (44) when said locator cap(51) is in an installed position and said stem (29) is rotated about its said axis.

3. A non-rise faucet assembly according to claim 2 wherein said stem rotation restriction means includes a first shoulder means (44) projecting radially outward from said stem, wherein said fourth abutment means (69) includes a second shoulder means projecting radially inward from said sleeve (58) for contact with said first shoulder means (44) when said locator cap is in an installed position and said stem is rotated abut its said axis, and wherein said locator cap index tab (68) is an axial extension of said second shoulder means.

4. A non-rise faucet assembly according to claim 2 wherein said first shoulder means (44) includes a pair of diametrically opposed first ribs extending axially along and projecting radially outward from said stem with each rib being separated from the other by a circumferentially extending recess (46), and wherein said second shulder means (69) includes a pair of diametrically spaced apart second ribs (71, 72) projecting radially inward from said sleeve (58), each of said second ribs projecting into one of said circumferentially extending recesses (46).

* * * * *